United States Patent
Nishihashi (10) Patent No.: US 9,092,836 B2
(45) Date of Patent: Jul. 28, 2015

(54) COMMODITY SELECTION SUPPORTING SYSTEM AND COMMODITY SELECTION SUPPORTING METHOD

(71) Applicant: TOSHIBA TEC KABUSHIKI KAISHA, Shinagawa-ku, Tokyo (JP)

(72) Inventor: Ran Nishihashi, Tokyo-to (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 184 days.

(21) Appl. No.: 13/803,991

(22) Filed: Mar. 14, 2013

(65) Prior Publication Data

US 2013/0256404 A1    Oct. 3, 2013

(30) Foreign Application Priority Data

Mar. 30, 2012    (JP) ................. 2012-081786

(51) Int. Cl.
*G06K 15/00* (2006.01)
*G06Q 90/00* (2006.01)
*G06Q 30/06* (2012.01)

(52) U.S. Cl.
CPC ............... *G06Q 90/00* (2013.01); *G06Q 30/06* (2013.01)

(58) Field of Classification Search
CPC ................. G06Q 30/06; G06Q 90/00
USPC ...................................... 235/383
See application file for complete search history.

(56) References Cited

U.S. PATENT DOCUMENTS

| 8,222,999 | B2 | 7/2012 | Hiramatsu et al. |
| 8,473,370 | B1 * | 6/2013 | Altendorf et al. ............ 705/26.8 |
| 2005/0211774 | A1 * | 9/2005 | Aso ................................. 235/383 |
| 2012/0203620 | A1 * | 8/2012 | Dobyns ....................... 705/14.38 |
| 2012/0253969 | A1 * | 10/2012 | Baruth ........................ 705/26.7 |

FOREIGN PATENT DOCUMENTS

| JP | 11-203347 | 7/1999 |
| JP | 2001-160095 | 6/2001 |
| JP | 2003-186965 | 7/2003 |
| JP | 2004-302910 | 10/2004 |
| JP | 2008-210223 | 9/2008 |
| WO | 2010141363 | 12/2010 |

OTHER PUBLICATIONS

Japanese Office Action for Japanese Patent Application No. 2012-081786 mailed Feb. 12, 2014.

* cited by examiner

*Primary Examiner* — Seung Lee
(74) *Attorney, Agent, or Firm* — Amin, Turocy & Watson, LLP (57) ABSTRACT

A commodity selection supporting system displays an image showing appearance of a subject-person on a display, e.g. the display of a tablet PC, reads information for identifying a commodity that is held close to the display on which the image of the subject-person is displayed and collects the identification information of the commodity read in association with information relevant to the appearance of the subject-person displayed on the display.

10 Claims, 8 Drawing Sheets

| COMMODITY ID | COMMODITY CATEGORY | COMMODITY NAME | UNIT PRICE | COMMODITY ATTRIBUTE |
|---|---|---|---|---|

| SUBJECT-PERSON ID | SEX | AGE GROUP | TYPE | SUBJECT-PERSON IMAGE | CUSTOMER ATTRIBUTE |
|---|---|---|---|---|---|

| SUBJECT-PERSON ID | COMMODITY ID1 | COMMODITY ID2 | COMMODITY ID3 | ~ | COMMODITY IDn |
|---|---|---|---|---|---|

| SUBJECT-PERSON ID | PURCHASED COMMODITY ID1 | PURCHASE DATE AND TIME |
|---|---|---|

COMMODITY SELECTION SUPPORTING SYSTEM AND COMMODITY SELECTION SUPPORTING METHOD

CROSS-REFERENCE TO RELATED APPLICATION

This application is based upon and claims the benefit of priority from Japanese Patent Application No. 2012-081786, filed Mar. 30, 2012, the entire contents of which are incorporated herein by reference.

FIELD

Embodiments described herein relate to a commodity selection supporting system using a portable information terminal and a commodity selection supporting method.

BACKGROUND

In a case in which clothing or an interior is selected as a gift, a customer expects to select a commodity suitable for her/him who receives the gift (gift receiver). If the customer selects a gift together with the gift receiver, then there will be no trouble. However, if the customer selects a gift without accompanying the gift receiver, for example, the customer selects, while thinking of the appearance of the gift receiver in mind, a commodity that is seemed to be suitable for the gift receiver. It is very troublesome for the customer.

Thus, if such a customer can have a proper advice from a customer concierge or a store clerk, then the customer satisfaction is increased, thereby increasing sales of the store. So, it is expected that in addition to information relevant to the appearance of a subject-person who receives the gift and information relevant to a commodity purchased as a gift, information relevant to a commodity that is selected but not purchased by the customer can be collected.

DETAILED DESCRIPTION

In accordance with an embodiment, a commodity selection supporting system comprises a display, an image display section, a reading section, and an interesting commodity collection section. The image display section enables the display to display an image showing appearance of a subject-person. The reading section reads information for identifying a commodity that is held close to the display on which the image of the subject-person is displayed. The interesting commodity collection section collects the identification information of the commodity, held close to the display, which is read by the reading section in association with information relevant to the appearance of the subject-person displayed on the display.

An embodiment of the commodity selection supporting system is described below with reference to the accompanying drawings. The system is constructed in a store in which accessories such as neckties and hats and clothing such as shirts and blouses are sold. Thus, in the present embodiment, a commodity selection supporting system using a cloud computing system is illustrated.

Figure 1:
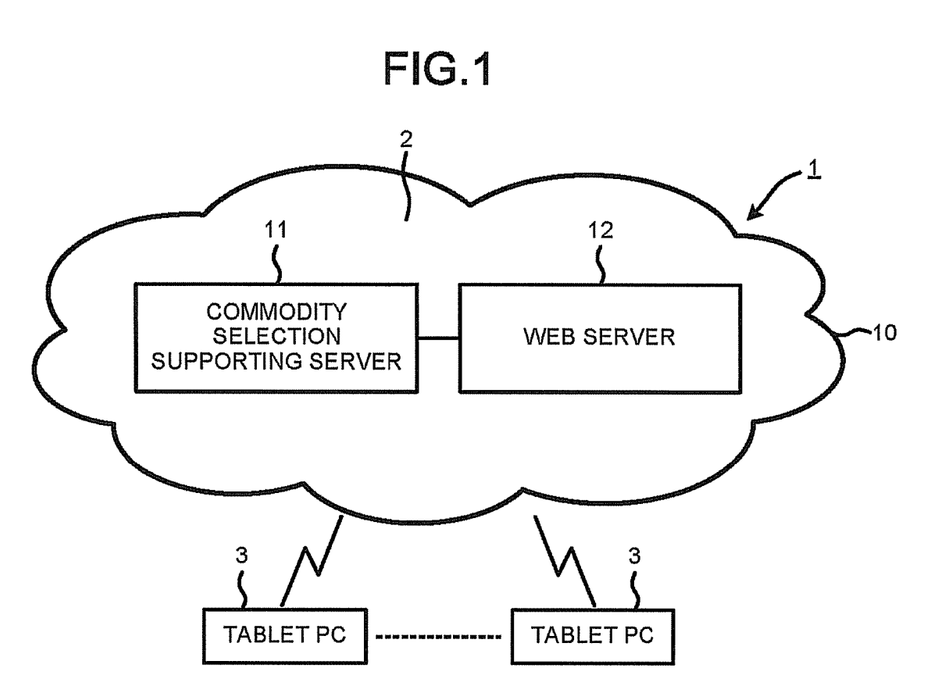
FIG. 1 is a diagram showing the whole configuration of a commodity selection supporting system according to an embodiment.

FIG. 1 is a schematic diagram illustrating the whole configuration of a commodity selection supporting system 1 according to the present embodiment. The commodity selection supporting system 1 comprises a server system 2 and a plurality of tablet PCs (personal computers) 3.

The server system 2 comprises a commodity selection supporting server 11 and a Web server 12. The servers 11 and 12 are connected with each other through a network called as a cloud 10 to exchange data therebetween. In addition, a data communication can be realized between the servers 11 and 12 and the tablet PCs 3 through a network such as the Internet.

Figure 2:
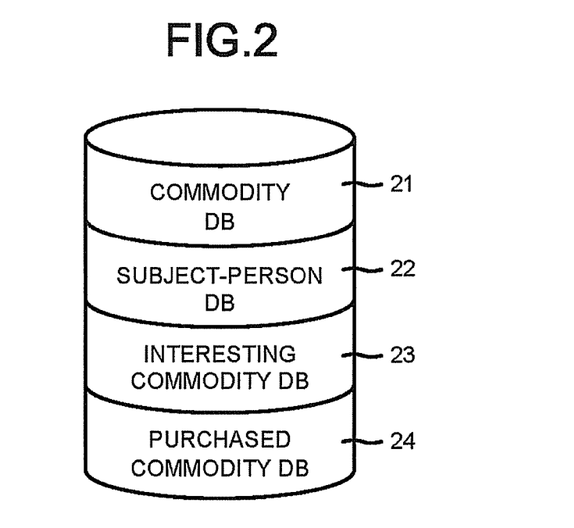
FIG. 2 is a schematic diagram illustrating the primary databases managed by a commodity selection supporting server according to the embodiment.

The commodity selection supporting server 11 manages a commodity database 21, a subject-person database 22, an interesting commodity database 23 and a purchased commodity database 24, as shown in FIG. 2.

Figure 3:
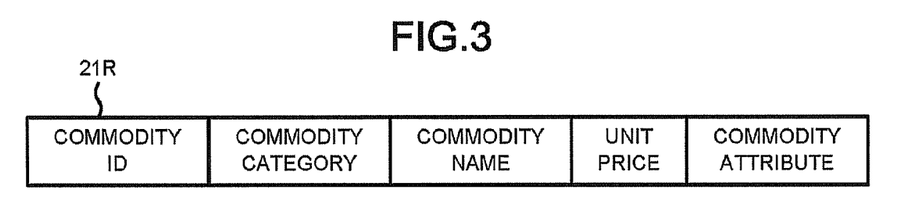
FIG. 3 is a schematic diagram showing the data structure of a commodity data record stored in a commodity database according to the embodiment.

A commodity data record 21R relevant to each commodity sold in the store is stored in the commodity database 21. As shown in FIG. 3, the commodity data record 21R contains each item data such as a commodity ID, a commodity category, a commodity name, a unit price and a commodity attribute information. The commodity ID is uniquely pre-assigned to each commodity. The commodity category represents the category (e.g. necktie, hat, necklace, white shirt and blouse) of a commodity identified by a corresponding commodity ID. The commodity name and unit price are information used in the sales registration of a commodity. The commodity attribute information refers to attributes (color, pattern, shape and size) of a commodity.

Figure 4:
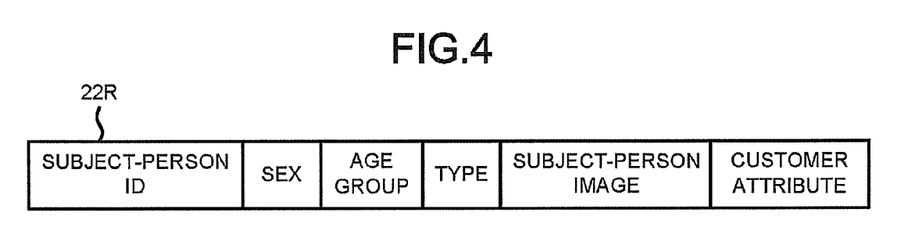
FIG. 4 is a schematic diagram showing the data structure of a subject-person data record stored in a subject-person database according to the embodiment.

A subject-person data record 22R relevant to a subject-person (gift receiver) to which a customer presents a commodity is stored in the subject-person database 22. As shown in FIG. 4, the subject-person data record 22R contains each item data such as a subject-person ID, sex, age group, appearance type, subject-person image and customer attribute information. The subject-person subject ID is automatically and uniquely generated for each new subject-person when the new subject-person is registered in the database 22. The sex, age group and appearance type are attributes of the subject-person identified by a corresponding subject-person ID. The subject-person image is an image including the face of a subject-person. The customer attribute information represents a relationship between a customer who presents a commodity and a subject-person who receives the commodity.

Figure 5:
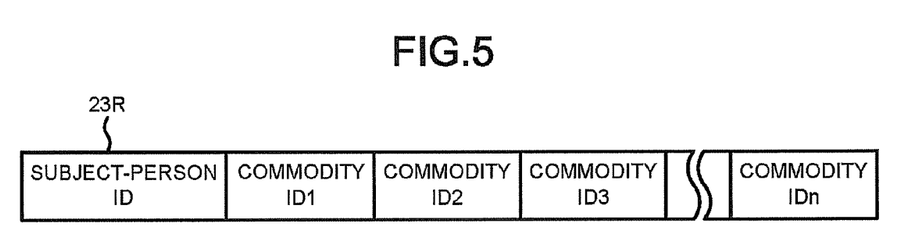
FIG. 5 is a schematic diagram showing the data structure of an interesting commodity data record stored in an interesting commodity database according to the embodiment.

An interesting commodity data record 23R relevant to a commodity which is interested by the customer as a gift for the subject-person is stored in the interesting commodity database 23. As shown in FIG. 5, the interesting commodity data record 23R contains a subject-person ID and at least one commodity ID. The commodity ID is the identification information of a commodity which is interested by the customer as a gift.

Figure 6:
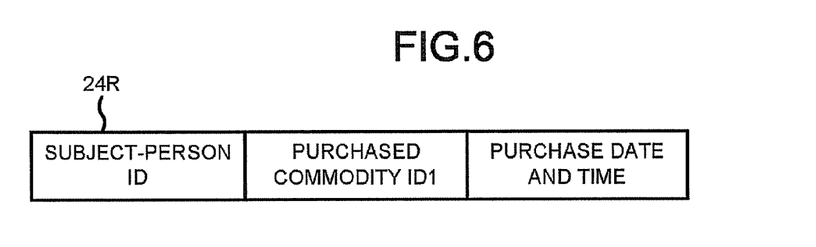
FIG. 6 is a schematic diagram showing the data structure of a purchased commodity data record stored in a purchased commodity database according to the embodiment.

A purchased commodity data record 24R relevant to a commodity which is purchased by the customer as a gift for the subject-person is stored in the purchased commodity database 24. As shown in FIG. 6, the purchased commodity data record 24R contains the subject-person ID, a purchased commodity ID and a purchase date and time data. The purchased commodity ID is an identification information for a commodity which is purchased by the customer as a gift for the subject-person. The purchased date and time data refers to the date and time when the customer purchases the commodity as a gift.

The tablet PC 3 is a portable personal computer in the shape of a tablet and is also called a tablet computer or a tablet terminal. The tablet PC 3 is carried by a store clerk in charge of a customer (herein after referred to as a customer concierge) and used when the customer concierge serves a customer who is selecting a gift.

Figure 7:
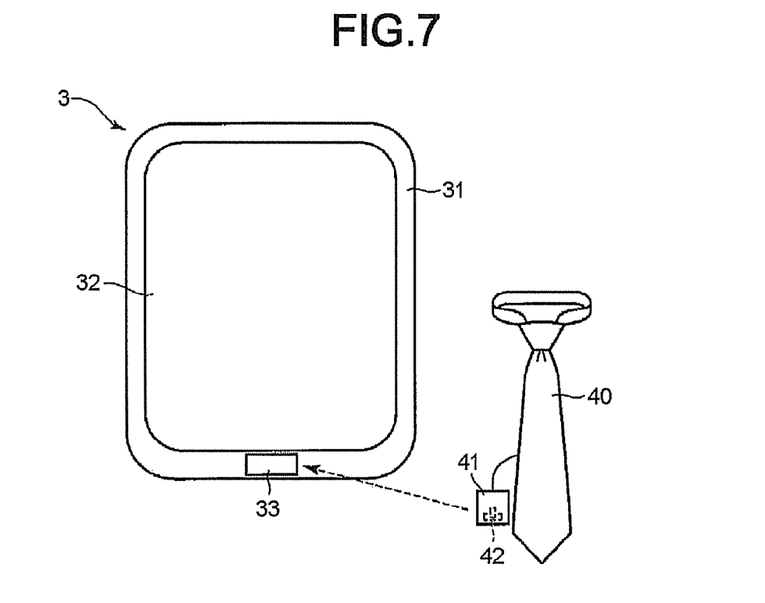
FIG. 7 is a front view of a tablet PC used in the embodiment.
Figure 8:
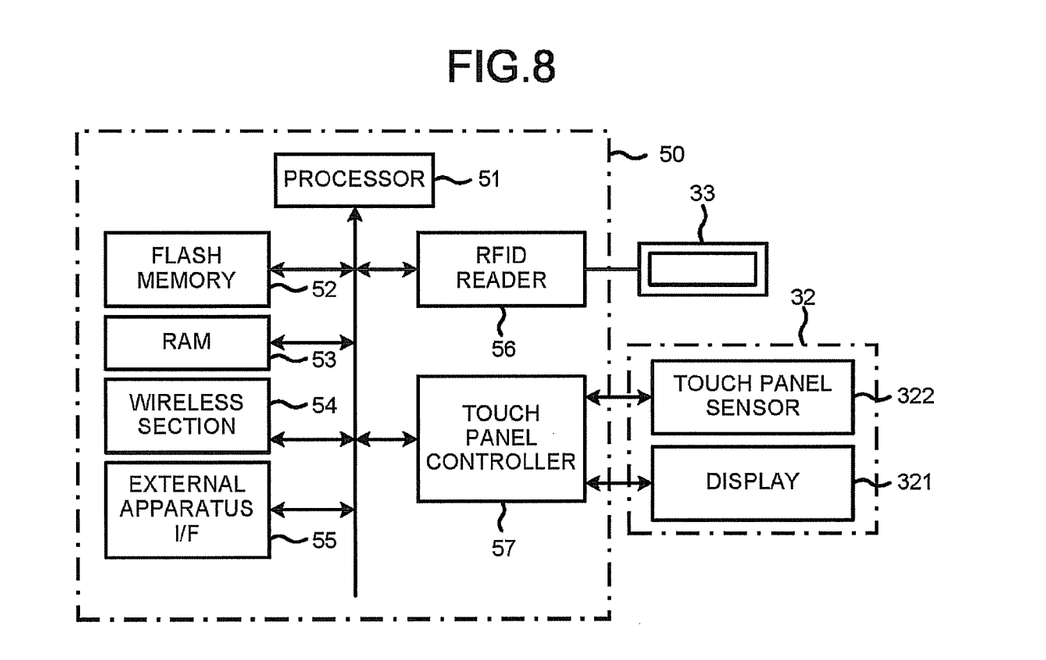
FIG. 8 is a block diagram of the tablet PC used in the embodiment.

FIG. 7 is a front view of the tablet PC 3, and FIG. 8 is a block diagram of the tablet PC 3. A touch panel 32 is arranged at the front surface of the tablet-shaped portable main body 31 of the tablet PC 3. The tablet PC 3 is provided with the antenna 33 of an RFID (Radio Frequency Identification) reader 56 below the touch panel 32. The RFID reader 56 wirelessly communicates with an RFID tag existing within the communication area of the antenna 33 and reads the data stored in a memory in the tag through the antenna 33 in a non-contact manner.

In the present embodiment, a commodity tag 41 is adhered on a commodity 40 such as a necktie, a hat and the like, and the RFID tag 42 is attached to the commodity tag 41. The commodity ID of the commodity to which the tag 42 is adhered is stored in the memory of the RFID tag 42. Therefore, when the commodity 40 is brought near the display 321 of the tablet PC 3, the memory data of the RFID tag 42 adhered on the commodity tag 41 of the commodity 40, that is, the commodity ID of the commodity, is read by the RFID reader 56 in a non-contact manner.

The RFID tag 42 may be directly attached on the commodity 40 without using the commodity tag 41. The place at which the antenna 33 is arranged is not limited to the lower side of the display 321. In short, the antenna 33 may be arranged at any position where the RFID reader 56 can read through the antenna 33, directly or indirectly, the memory data of the RFID tag 42 adhered on the commodity 40 brought near the display 321. Alternatively, a plurality of antennas may be arranged around the display 321 to enhance the reading accuracy.

A control board 50 is built in the main body 31. A processor 51, a flash memory 52, a RAM (Random Access Memory) 53, a wireless section 54, an external device interface 55, an RFID reader 56 and a touch panel controller 57 are mounted on the control board 50.

The wireless section 54 receives, via a wireless base station (not shown), data wirelessly sent from the server system 2 in the cloud 10. Moreover, the wireless section 54 sends data addressed to the server system 2. The external device interface 55 detachably connects with, for example, a keyboard meeting a USB standard, a printer and a memory and performs transmission/reception of a data signal with a connected apparatus. The touch panel controller 57 controls the screen display of the display 321. The touch panel controller 57 detects the coordinate of a position on the display 321 that is touched based on a signal from a touch panel sensor 322 overlaid on the screen of the display 321. The touch panel 32 is constructed with the display 321 and the touch panel sensor 322.

Various memory areas for storing variable data temporarily are formed in the RAM 53. The flash memory 52 stores programs downloaded from the server system 2 by using the SaaS of cloud computing. The programs include a commodity selection supporting program downloaded from the commodity selection supporting server 11.

If the store clerk (customer concierge) carrying the tablet PC 3 is asked by a customer to give an advice of a gift, the store clerk operates the tablet PC 3 to select a commodity selection support service from the job menus on the tablet PC 3. Then, the commodity selection supporting program is started. In this case, the processor 51 starts the information processing procedures shown in flowcharts in FIG. 9 and FIG. 10.

Figure 9:
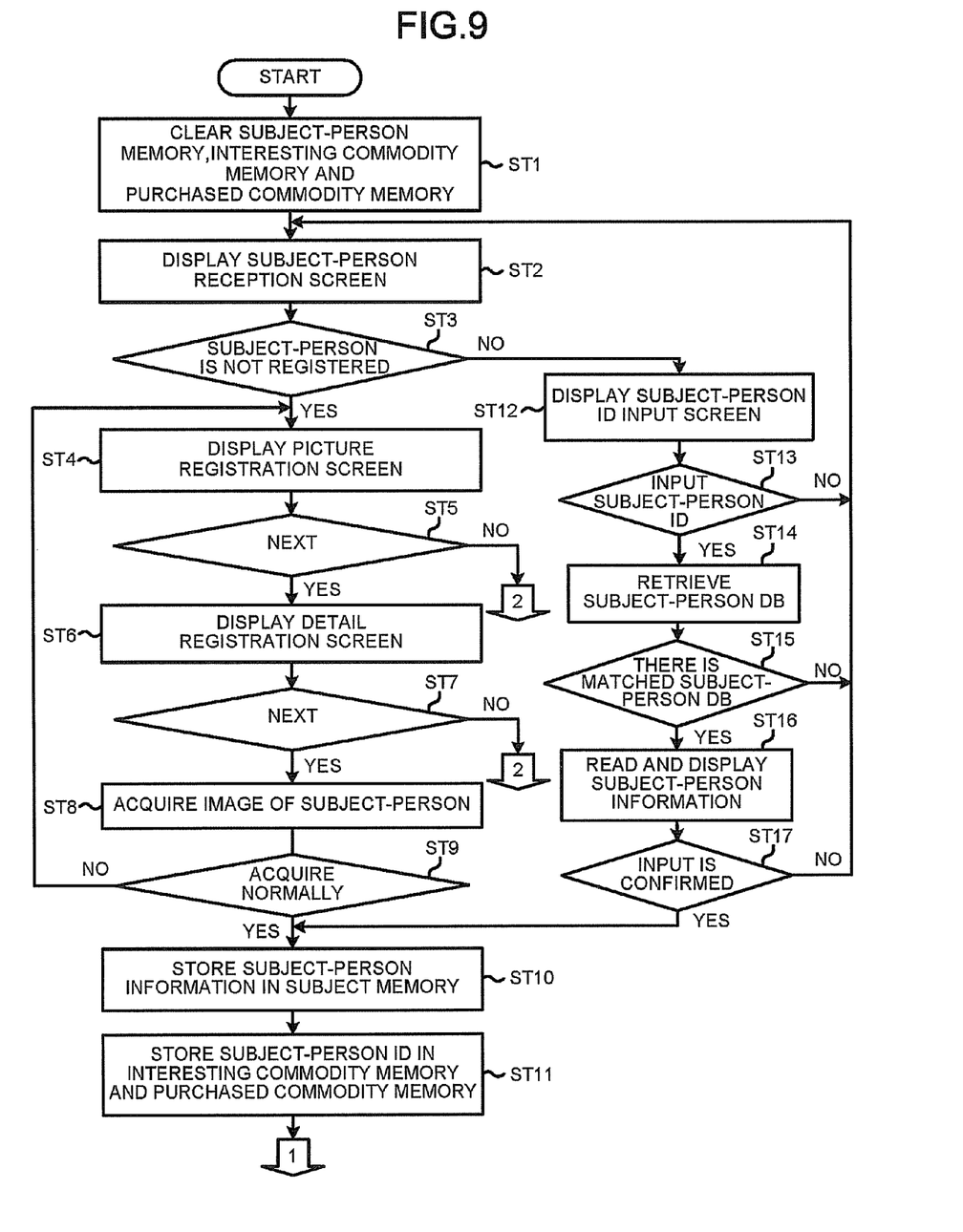
FIG. 9 is a flowchart illustrating the first half of an information processing procedure executed by the processor of the tablet PC used in the embodiment in accordance with a commodity selection supporting program.

First, the processor 51 clears areas of the subject-person memory, the interesting commodity memory and the purchased commodity memory that are formed in the RAM 53 (ST1). The subject-person memory stores the item data of the subject-person data record 22R. The interesting commodity memory stores the item data of the interesting commodity data record 23R. The purchased commodity memory stores the item data of the purchased commodity data record 24R.

Figure 11:
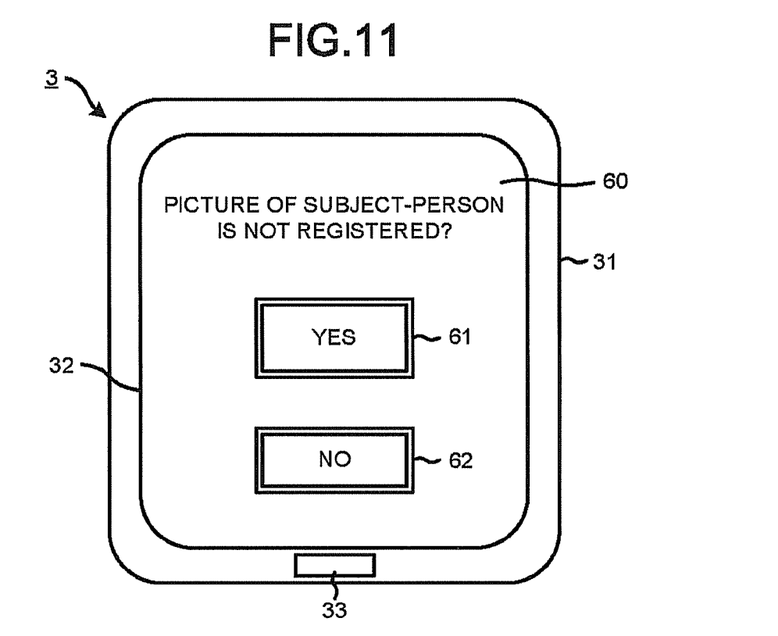
FIG. 11 is a diagram showing an example of a subject-person reception screen displayed on the display of the tablet PC according to the embodiment.

The processor 51 activates the display 321 of the touch panel 32 to display a subject-person reception screen 60 (ST2). FIG. 11 shows an example of the subject-person reception screen 60. As shown in FIG. 11, a message 'whether or not the picture image of the subject-person is registered in the system?' and images of a button 'YES' 61 and a button 'NO' 62 are all displayed on the subject-person reception screen 60.

Therefore, the customer receptionist confirms whether or not the picture image of the subject-person is already registered in the system to the customer. If the customer formally purchased a gift or asked an advice for a gift for the same subject-person, using the system and the subject-person ID to the same subject-person is identified by the customer, then the picture image of the subject-person is already registered. Otherwise, the picture image of the subject-person is not registered. In the case in which the registration is already performed, the customer concierge touches the button 'NO'

62. In the case in which the registration is not performed, the customer concierge touches the button 'YES' 61.

Figure 12:
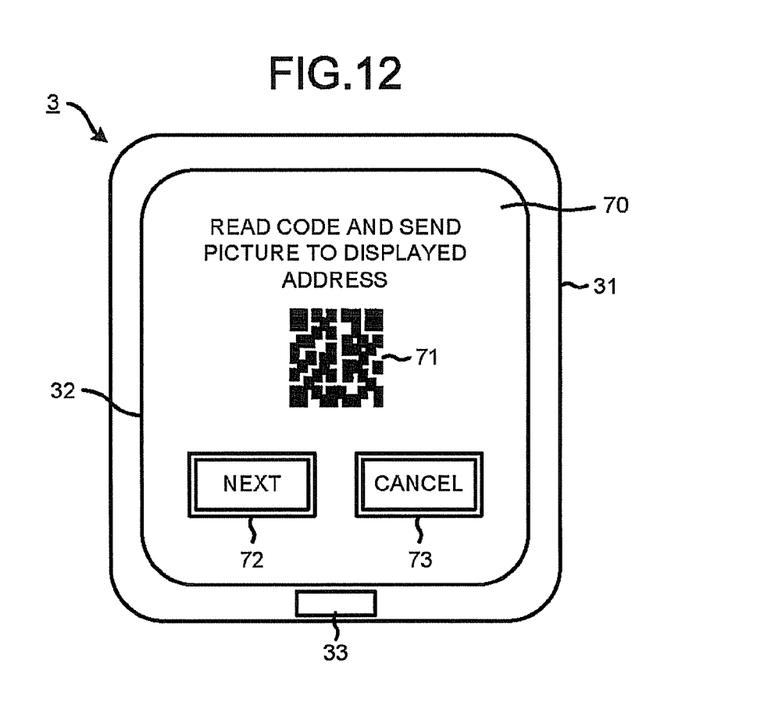
FIG. 12 is a diagram showing an example of a photograph registration screen displayed on the display of the tablet PC according to the embodiment.

After the subject-person reception screen 60 is displayed, the processor 51 waits for a touch operation on either of the button 'YES' 61 or the button 'NO' 62 (ST3). If it is detected according to a signal from the touch panel sensor 322 that the button 'YES' 61 is touched, the processor 51 switches the screen of the display 321 to a subject-person picture image registration screen 70 (ST4: image acquisition section). FIG. 12 shows an example of the picture image registration screen 70. As shown in FIG. 12, a two-dimensional code 71 containing a URL (Uniform Resource Location) designating a location on the Web is displayed on the picture image registration screen 70 together with images of a button 'next' 72 and a button ' cancel' 73.

The customer concierge confirms, to the customer, whether or not the picture image of the subject-person is stored in a communication device such as a portable telephone. The system is unusable if no picture image of the subject-person is stored in the communication device. In this case, the customer concierge touches the button 'cancel' 73. On the contrary, if there is a picture image of the subject-person in the communication device, the customer concierge asks the customer to read the two-dimensional code 71 using the code reader function of the communication device and to send the picture image of the subject-person to the URL displayed on the device. At this time, the customer is required to input a password. Then, if it is confirmed that the picture image data with the password is sent to the location of the URL, then the customer concierge touches the button 'next' 72.

After the picture image registration screen 70 is displayed, the processor 51 waits for a touch operation on either of the button 'next' 72 or the button 'cancel' 73 (ST5). If it is detected according to a signal from the touch panel sensor 322 that the button 'cancel' 73 is touched (NO in ST5), the processor 51 erases the image on the display 321 (ST29). Then, the commodity selection supporting program is ended.

Figure 13:
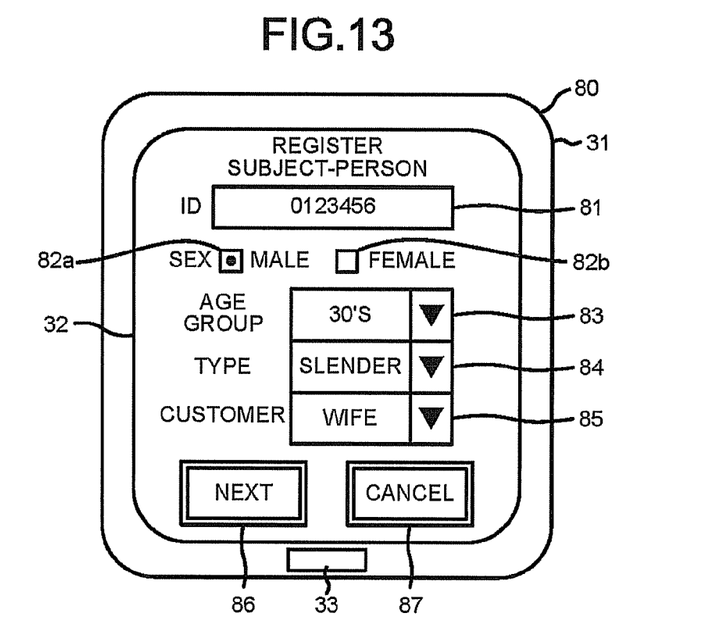
FIG. 13 is a diagram showing an example of a detail registration screen displayed on the display of the tablet PC according to the embodiment.

If it is detected that the button 'next' 72 is touched (YES in ST5), the processor 51 switches the screen of the display 321 to a subject-person detail registration screen 80 (ST6: input reception section). FIG. 13 shows an example of the detail registration screen 80. As shown in FIG. 13, a display box 81 for displaying a subject-person ID, check boxes 82a and 82b for selecting sex (male or female) and select boxes 83, 84 and 85 for respectively selecting an age group, an appearance type and a customer attribute are displayed on the detail registration screen 80. Images of a button 'Next' 86 and a button 'cancel' 87 are further displayed on the detail registration screen 80. A new subject-person ID automatically generated is displayed in the display box 81.

The customer concierge orally notifies the customer of the new subject-person ID. At this time, if a small portable printer is connected via the external device interface, the subject-person ID may be printed on a record paper by the printer and the record paper is handed to the customer.

Further, the customer concierge confirms the sex, age group (e.g. 10's, 20's, 30's, 40's . . . ) and appearance type (e.g. standard, slender, fat, black, white) of the subject-person and the customer attribute (father, mother, wife, lover, friend, colleague) and inputs the confirmed information into the check boxes 82a and 82b and the select boxes 83, 84 and 85. Then, when the input is ended, the customer receptionist touches the button 'next' 86. If the input is stopped, the customer concierge touches the button 'Cancel' 87. Such inputs may be conducted by the customer but not by the customer concierge.

After the detail registration screen 80 is displayed, the processor 51 waits for a touch operation on either of the button 'next' 86 or the button 'cancel' 87 (ST7). If it is detected according to a signal from the touch panel sensor 322 that the button 'cancel' 87 is touched (NO in ST7), the processor 51 erases the image on the display 321 (ST29). Then, the commodity selection supporting program is ended.

On the contrary, if it is detected that the button 'next' 86 is touched (YES in ST7), the processor 51 switches the screen of the display to a password input screen 80. An input box for inputting a password, and a soft keyboard including numeric and alphabetical characters required to input a password are displayed on the password input screen together with a button 'next'. The customer concierge urges the customer to input the password used when the picture image of the subject-person is sent. When the input is ended, the customer concierge touches the button 'next'. Then, the processor 51 instructs the Web server 12 to acquire the image of the subject-person on which the password is associated from the URL contained in the two-dimensional code 71 to the Web server 12 (ST8). Then, the processor 51 confirms whether or not the image of the subject-person is normally acquired (ST9).

The Web server 12 receiving the instruction issued in ST8 confirms whether or not the picture image data with the password is stored at a position designated by the URL on the Web. If the picture image data with the password is stored at a position designated by the URL on the Web, the Web server 12 transmits the image data to the tablet PC3 which issues the instruction. If picture image data with the password is not stored, the Web server 12 returns an error response 'data does not exist' to the tablet PC3 which issues the instruction.

If the error response is received from the Web server 12 (NO in ST9), the processor 51 switches the screen of the display 321 to the subject-person picture image registration screen 70 (ST4). Then, the processor 51 executes the processing following ACT ST4 again.

If the image data is normally received from the Web server 12 (YES in ST9), the processor 51 stores the image data, along with the item data, i.e., the subject-person ID, sex, age group, appearance type and customer attributes, registered from the detail registration screen 80, in the subject-person memory (ST10). Further, the processor 51 stores the subject-person ID in the interesting commodity memory and the purchased commodity memory (ST11).

Figure 14:
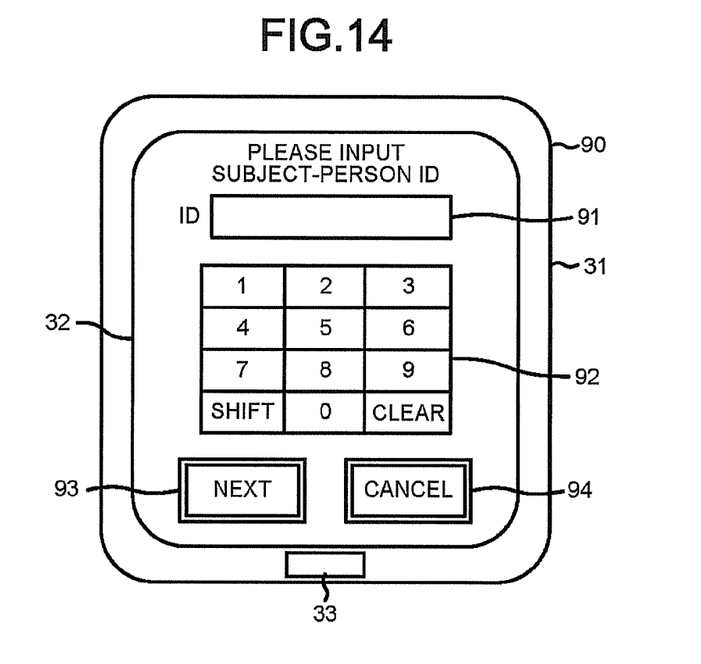
FIG. 14 is a diagram showing an example of a subject-person ID input screen displayed on the display of the tablet PC according to the embodiment.

On the other hand, if it is detected according to a signal from the touch panel sensor 322 that the button 'NO' 62 is touched in ACT ST3 (NO in ST3), the processor 51 switches the screen of the display 321 to a subject-person ID input screen 90 (ST12). FIG. 14 shows an example of the subject-person ID input screen 90. As shown in FIG. 14, an input box 91 for a subject-person ID, a soft keyboard 92 including numeric and alphabetical characters required to input a subject-person ID and images of a button 'next' 93 and a button 'cancel' 94 are displayed on the subject-person ID input screen 90.

Then, the customer concierge operates the soft keyboard 92 to input the subject-person ID obtained from the customer. After inputting the subject-person ID, the customer concierge touches the button 'next' 93. On the other hand, the customer concierge touches the button 'cancel' 94 if the input is stopped. The input may be conducted by the customer but not by the customer concierge.

After the subject-person ID input screen 90 is displayed, the processor 51 waits for a touch operation on either of the button 'next' 93 or the button 'cancel' 94 (ST13). If it is detected according to a signal from the touch panel sensor 322 that the button 'cancel' 94 is touched (NO in ST13), the processor 51 switches the screen of the display 321 to the subject-person reception screen 60 (ST2). Then, the processor 51 waits for a touch operation on either of the button 'YES' 61 or the button 'NO' 62 on the subject-person reception screen 60 (ST3).

If it is detected that the button 'next' 93 is touched (YES in ST13), the processor 51 instructs the commodity selection supporting server 11 to perform an information retrieval of the subject-person designated by the subject-person ID inputted (ST14). Then, the processor 51 confirms whether or not the information of the subject-person is normally acquired (ST15).

The commodity selection supporting server 11 receiving the instruction issued in ACT ST14 retrieves, using the subject-person ID as a key character, the subject-person database 22 to detect a subject-person data record 22R in which the subject-person ID (key character) is set. If a subject-person data record 22R having a subject-person ID the same as the key character is detected, the commodity selection supporting server 11 transmits the data in the detected subject-person data record 22R to the tablet PC3 that issues the information retrieval instruction. If no subject-person data record 22R having a subject-person ID the same as the key character is detected, the commodity selection supporting server 11 returns an error response 'data does not exist' to the tablet PC3 described above.

If the error response 'data does not exist' is received from the commodity selection supporting server 11 (NO in ST15), the processor 51 switches the screen of the display 321 to the subject-person reception screen 60 (ST2). Then, the processor 51 waits for a touch operation on either of the button 'YES' 61 or the button 'NO' 62 on the subject-person reception screen 60 (ST3).

Figure 15:
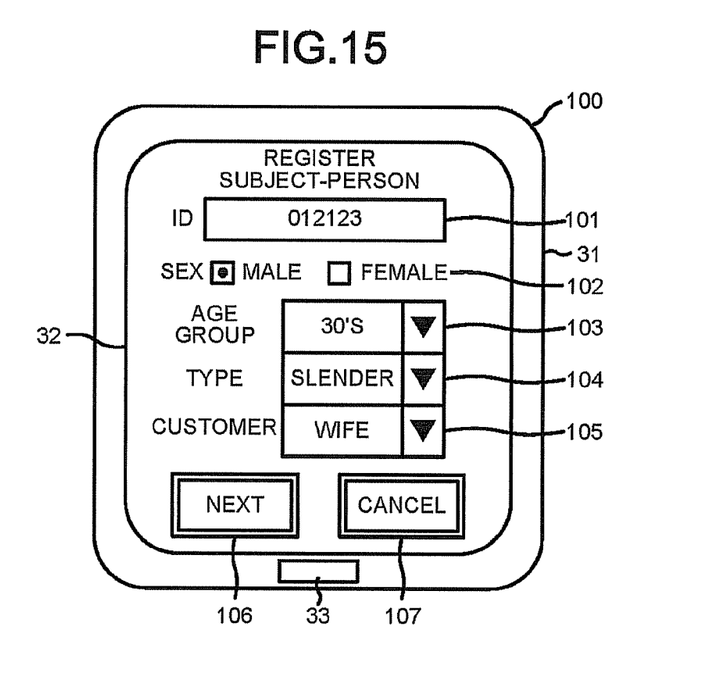
FIG. 15 is a diagram showing an example of a subject-person detail information screen displayed on the display of the tablet PC according to the embodiment.

If the data of the subject-person data record 22R is received from the commodity selection supporting server 11 (YES in ST15), the processor 51 acquires item data, i.e., the subject-person ID, sex, age group, appearance type and customer attributes from the record 22R received. Then, the processor 51 switches the screen of the display 321 to a subject-person detail information screen 100 (ST16). FIG. 15 shows an example of the subject-person detail information screen 100. As shown in FIG. 15, display boxes 101, 102, 103, 104 and 105 for a subject ID, sex, an age group, an appearance type and a customer attribute are displayed on the subject-person detail information screen 100 together with images of a button 'next' 106 and a button 'cancel' 107. Then, the item data, i.e., the subject-person ID, sex, age group, appearance type and customer attribute, acquired from the subject-person data record 22R is displayed in the display boxes 101, 102, 103, 104 and 105.

Then, the customer receptionist confirms whether or not the content on the detail information screen 100 is correct to the customer. The customer concierge touches the button 'next' 106 if the content on the detail information screen 100 is correct or the button 'cancel' 107 otherwise.

After the detail information screen 100 is displayed, the processor 51 waits for a touch operation on either of the button 'next' 106 or the button 'cancel' 107 (ST17). If it is detected according to a signal from the touch panel sensor 322 that the button 'cancel' 87 is touched (NO in ST17), the processor 51 switches the screen of the display 321 to the subject-person reception screen 60 (ST2). Then, the processor 51 waits for a touch operation on either of the button 'YES' 61 or the button 'NO' 62 on the subject-person reception screen 60 (ST3).

On the contrary, if it is detected that the button 'next' 106 is touched (YES in ST17), the processor 51 executes the processing of ACT ST10. The processor 51 stores the item data, i.e., the subject-person ID, sex, age group, appearance type and customer attribute, obtained from the subject-person data record 22R in the subject-person memory along with the subject-person image data acquired from the same record 22R. Further, the processor 51 stores the subject-person ID in the interesting commodity memory and the purchased commodity memory (ST11).

Figure 10:
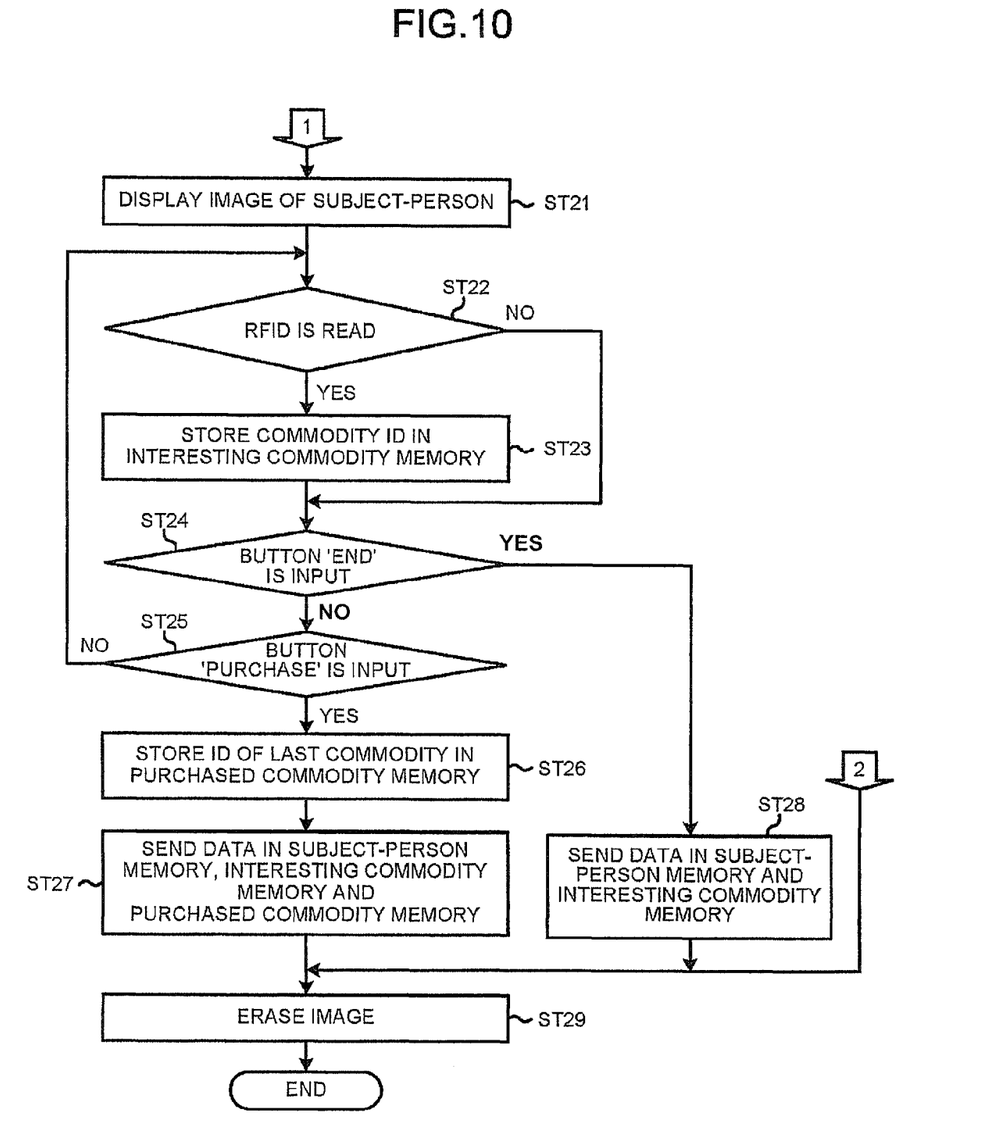
FIG. 10 is a flowchart illustrating the second half of the information processing procedure executed by the processor of the tablet PC used in the embodiment in accordance with the commodity selection supporting program.
Figure 16:
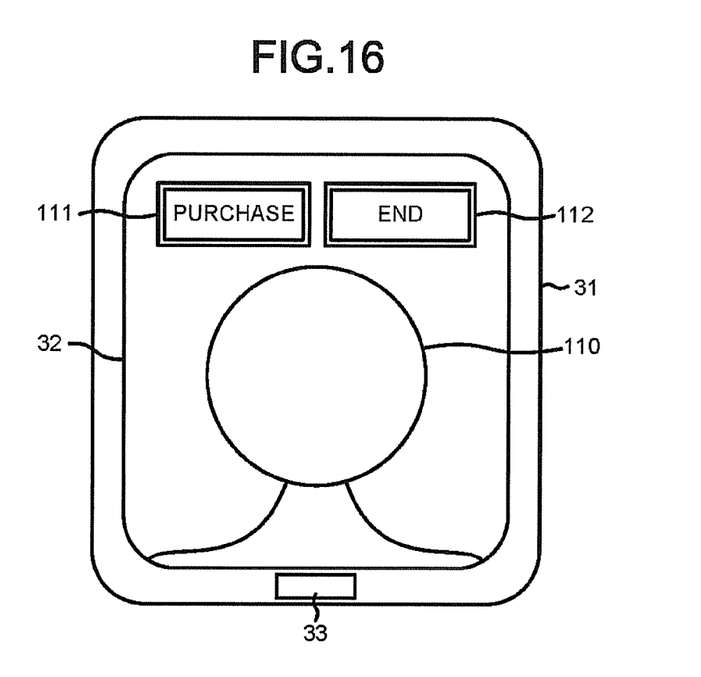
FIG. 16 is a diagram showing an example of a subject-person face-image screen displayed on the display of the tablet PC according to the embodiment.

Even if the subject-person is a new one or the subject-person is already registered, when ACT ST 11 is ended, the processor 51 captures image data of a facial part from the image data of the subject-person stored in the subject-person memory. Then, the processor 51 enlarges or reduces the facial part image data and, as shown in FIG. 16, displays the processed face image 110 of the subject-person on the whole screen of the display 321 (ST21: image display section). Further, the processor 51 displays images of a button 'purchase' 111 and a button 'end' 112 along with the face image 110.

Sequentially, the customer receptionist selects some of commodities which are suitable for or fit the subject-person while viewing the face image 110 of the subject-person displayed on the display 321 and holds the selected commodities near the display 321. Alternatively, the customer holds the commodities that are selected by his or herself near the display 321.

When the commodity 40 is held near the display 321, the data of the RFID tag 42 that is directly or indirectly adhered on the commodity, i.e., a commodity ID assigned to the commodity, is read by the RFID reader 56 in a non-contact manner.

As the commodity is put close to the display 321 on which the face image of the subject-person is displayed, the customer can easily select a gift suitable for the appearance of the subject-person. In addition, the customer receptionist can give the customer a proper advice while viewing the appearance of the subject-person. If the customer determines to purchase a commodity as a gift, then the customer concierge puts the commodity close to the display 321 and then touches the button 'purchase' 111. The customer concierge touches the button 'end' 112 if the customer cancels the purchase.

The processor 51, which activates the display 321 to display the face image 110 of the subject-person, waits until the memory data, i.e., the commodity ID, in the RFID tag 42 is read by the RFID reader 56 (ST22: reading unit). Then, every time a commodity ID is read from the RFID tag 42, the processor 51 sequentially stores the commodity ID in the interesting commodity memory (ST 23).

Further, the processor 51 waits for a touch operation on either of the button 'purchase' 111 or the button 'end' 112 (ST24, ST25). If it is detected according to a signal from the touch panel sensor 322 that the button 'purchase' 111 is touched (YES in ST25), the processor 51 stores the commodity ID that is last stored in the interesting commodity memory in the purchased commodity memory (ST26). After that, the processor 51 sends each data in the subject-person memory, the interesting commodity memory and the purchased commodity memory to the commodity selection supporting server 11 (ST27: interesting commodity collection section, purchased commodity collection section).

On the other hand, if it is detected that the button 'end' 112 is touched (YES in ST24), the processor 51 sends each data in the subject-person memory and the interesting commodity memory to the commodity selection supporting server 11 (ST 28: interesting commodity collection section). The data in the purchased commodity memory is not sent.

After the processing of ACT ST 27 or ACT ST 28 is performed, the processor 51 erases the face image of the subject-person displayed on the display 321 (ST29). Then, the commodity selection supporting program is ended.

In this way, according to the commodity selection supporting system 1 of the present embodiment, the face image of the subject-person is displayed on the display 321 of the tablet PC3 carried by the customer receptionist. Therefore, the customer receptionist or the customer can confirm whether or not a commodity is suitable for the subject-person by holding the commodity close to the face image of the subject-person, thus, the customer can select a commodity suitable for the appearance of the subject-person even if the subject-person does not accompany.

Further, in the tablet PC 3 provided with a display 321 on which the face image of the subject-person is displayed, the commodity IDs of commodities that are respectively held by the customer concierge or the customer close to the display 321 to select a gift are sequentially collected. Then, the collected commodity IDs are sent from the tablet PC 3 to the commodity selection supporting server 11 in association with the subject-person ID for specifying the subject-person and then stored in the interesting commodity database 23.

In addition, the commodity ID of a commodity the customer determines to purchase as a gift is also sent from the tablet PC 3 to the commodity selection supporting server 11 in association with the subject-person ID and then stored in the purchased commodity database 24.

On the other hand, in the subject-person database 22 managed by the commodity selection supporting server 11, the Sex, age group, appearance type, face image data of the subject-person and the like are stored therein in association with the subject ID of the subject-person. In the commodity database 21, commodity attribute information, such as color, patter, shape and size, is stored therein in association with the commodity ID of each commodity.

Thus, an analysis on a preferred commodity, such as a commodity which is interested by the customer or the customer concierge, or a commodity purchased by the customer, can be easily conducted according to the data in the databases 21-24 with reference to attributes (sex, age group, appearance type) of the subject-person. Particularly, information of the commodities which are interested cannot be obtained from the settlement data acquired from a POS (Point Of Sales) system. However, the system of the present embodiment can collect such information. Moreover, by utilizing the analyzed data for another case, the customer concierge can offer more proper advice to the customer who purchases a gift. As a result, the customer satisfaction is greatly enhanced and it can be thus expected to increase the commodity sales amount in the store.

The present invention is not limited to the embodiment described above.

In the embodiment above, the system cannot be used if no picture image of the subject-person is stored in the communication terminal such as a portable telephone. However, the present invention is not limited to this. For example, if the customer has a picture of the subject-person, the picture can be scanned by a scanner connected with an external device interface 55 and then ACT ST6 in FIG. 9 is taken. Alternatively, ACTs ST4 and ST5 can be omitted if the customer operates, before visiting the store, a personal computer to access the Website of the store over the Internet and picture image data of the subject-person is registered beforehand.

In addition, in the embodiment above, an RFID system is illustrated, as a reading unit, which reads information (commodity ID) for identifying a commodity that is held close to the display 321 on which the picture image of the subject-person is displayed. However, the reading unit is not limited to this. In short, the reading unit may be any unit that can automatically acquire information for identifying the commodity that is held close to the display 321.

Also, in the embodiment above, a tablet PC3 is illustrated as a terminal having a display for displaying an image showing the appearance of the subject-person. However, the terminal is not limited to be in a tablet form but can be a notebook computer or a multi-function portable telephone.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity selection supporting system, comprising:
    a display configured to display an image showing appearance of a subject-person;
    a reader configured to read identification information for identifying a commodity that is held close to the display;
    an interesting commodity memory configured to store the identification information every time the reader reads the identification information of the commodity that is held close to the display;
    a purchased commodity memory configured to store the identification information that is last stored in the interesting commodity memory in response to reception of a purchase notification of the commodity; and
    a processor configured to collect the identification information of the commodity, stored in the interesting commodity memory and the purchased commodity memory, in association with information relevant to the appearance of the subject-person displayed on the display.

2. The commodity selection supporting system according to claim 1, further comprising:
    an image acquisition section configured to acquire the image showing the appearance of the subject-person,
    wherein the image display section enables the display to display the image acquired by the image acquisition section.

3. The commodity selection supporting system according to claim 1, further comprising:
    an input reception section configured to receive input of the information relevant to the appearance of the subject-person, wherein
    the interesting commodity collection section collects the information input through the input reception section in association with the identification information of the commodity held close to the display.

4. The commodity selection supporting system according to claim 1, wherein the display is provided in a portable information terminal in a tablet form.

5. The system according to claim 1, further comprising a purchase button that generates the purchase notification of the commodity.

6. The system according to claim 5, wherein the purchase button is displayed on the display.

7. The system according to claim 5, wherein the processor collects the identification information of the commodity, stored in the interesting commodity memory, in association with the information relevant to the appearance of the subject-person displayed on the display if purchase is not notified by the purchase button.

8. The system according to claim 1, further comprising:
an interface which communicates with a server, wherein the processor sends the identification information of the commodity, stored in the interesting commodity memory and the purchased commodity memory, in association with the information relevant to the appearance of the subject-person displayed on the display to the server via the interface.

9. A commodity selection supporting method by a commodity selection supporting system having a display and a reading unit, comprising:
displaying an image showing appearance of a subject-person on the display;
reading, by the reading unit, identification information for identifying a commodity held close to the display;
storing the identification information each time the reading unit reads the identification information of the commodity that is held close to the display;
storing the identification information that is last stored in the interesting commodity memory in response to receiving a purchase notification for the commodity; and
collecting the identification information stored in the interesting commodity memory and the purchased commodity memory in association with information relevant to the appearance of the subject-person displayed on the display.

10. A non-transitory computer-readable medium having stored thereon instructions that, in response to execution, cause a system comprising a processor to perform operations, the operations comprising:
displaying an image showing appearance of a subject-person on a display;
reading identification information for identifying a commodity held close to the display;
storing the identification information each time the reading unit reads the identification information of the commodity that is held close to the display;
storing the identification information that is last stored in the interesting commodity memory in response to receiving a purchase notification for the commodity; and
collecting the identification information stored in the interesting commodity memory and the purchased commodity memory in association with information relevant to the appearance of the subject-person displayed on the display.

* * * * *